(12) United States Patent
Reineccius et al.

(10) Patent No.: US 10,005,371 B2
(45) Date of Patent: Jun. 26, 2018

(54) GRID INTEGRATION WITH PHOTOVOLTAIC GENERATION AND ELECTRIC VEHICLE CHARGING

(71) Applicant: POWERTREE SERVICES, INC., San Francisco, CA (US)

(72) Inventors: Stacey Reineccius, San Francisco, CA (US); John C. Sellers, El Cerrito, CA (US); Franklin Gobar, San Rafael, CA (US)

(73) Assignee: POWERTREE SERVICES, INC., San Francisco, CA (US)

( * ) Notice: Subject to any disclaimer, the term of this patent is extended or adjusted under 35 U.S.C. 154(b) by 176 days.

(21) Appl. No.: 15/206,087

(22) Filed: Jul. 8, 2016

(65) Prior Publication Data
US 2017/0008413 A1 Jan. 12, 2017

Related U.S. Application Data

(60) Provisional application No. 62/190,517, filed on Jul. 9, 2015.

(51) Int. Cl.
*H02J 7/00* (2006.01)
*B60L 11/18* (2006.01)
(Continued)

(52) U.S. Cl.
CPC ............. *B60L 11/1846* (2013.01); *H02J 3/14* (2013.01); *H02J 3/32* (2013.01); *H02J 3/383* (2013.01);
(Continued)

(58) Field of Classification Search
CPC .............. B60L 11/1816; B60L 11/1809; B60L 11/1801; B60L 11/1842
(Continued)

(56) References Cited

U.S. PATENT DOCUMENTS 5,548,200 A * 8/1996 Nor ....................... B60L 11/184
320/106
8,346,401 B2 * 1/2013 Pollack ............... B60L 11/1824
700/291

(Continued)

OTHER PUBLICATIONS

PCT/US2016/041630, International Search Report and Written Opinion, dated Sep. 28, 2016, 10 pages.

*Primary Examiner* — Yalkew Fantu
(74) *Attorney, Agent, or Firm* — Stoel Rives LLP

(57) ABSTRACT

System and methods for electric vehicle charging are described. A preferred charging rate associated with an electric vehicle is determined. The preferred charging rate is compared with a first charging rate associated with a utility service current source and a second charging rate associated with an electrical energy storage device. The utility service current source supports the first charging rate and the electrical energy storage device supports the second charging rate, where the second charging rate is greater than the first charging rate. A transfer switch is instructed to select one of the utility service current source and the electrical energy storage device based on the comparison. The transfer switch is coupled to an electric vehicle charger and supplies current to the electric vehicle charger via the selected current source. The electric vehicle is charged at the preferred charging rate using at least the selected current source.

23 Claims, 7 Drawing Sheets

(51) Int. Cl.
*H02J 3/14* (2006.01)
*H02J 3/32* (2006.01)
*H02J 3/38* (2006.01)

(52) U.S. Cl.
CPC ..... *H02J 2003/143* (2013.01); *Y02B 70/3225* (2013.01); *Y02B 70/3266* (2013.01); *Y02E 10/563* (2013.01); *Y02E 10/566* (2013.01); *Y02E 60/721* (2013.01); *Y02E 70/30* (2013.01); *Y02T 90/168* (2013.01); *Y04S 10/126* (2013.01); *Y04S 20/222* (2013.01); *Y04S 20/224* (2013.01); *Y04S 20/242* (2013.01); *Y04S 30/12* (2013.01)

(58) Field of Classification Search
USPC ....................................................... 320/109
See application file for complete search history.

(56) References Cited

U.S. PATENT DOCUMENTS

| | | | |
|---|---|---|---|
| 8,509,976 B2* | 8/2013 | Kempton | B60L 11/1824 701/22 |
| 2007/0282495 A1 | 12/2007 | Kempton et al. | |
| 2010/0017249 A1 | 1/2010 | Fincham et al. | |
| 2011/0004358 A1 | 1/2011 | Pollack et al. | |
| 2012/0249065 A1* | 10/2012 | Bissonette | B60L 11/184 320/109 |
| 2014/0088781 A1* | 3/2014 | Kearns | H02J 3/14 700/295 |
| 2016/0236583 A1* | 8/2016 | Kamen | B60L 8/003 |

* cited by examiner

GRID INTEGRATION WITH PHOTOVOLTAIC GENERATION AND ELECTRIC VEHICLE CHARGING

RELATED APPLICATION

This application claims the benefit under 35 U.S.C. § 119(e) of U.S. Provisional Application No. 62/190,517 filed Jul. 9, 2015, which is incorporated by reference herein in its entirety.

TECHNICAL FIELD

The present disclosure relates to techniques for electric vehicle charging. However, it is appreciated that the described techniques can be used more generally for battery charging or for powering electrical loads. Electric vehicle charging can require large amounts of electrical energy. Therefore, there needs to be systems and methods in place for providing that electrical energy.

DETAILED DESCRIPTION

Figure 1:
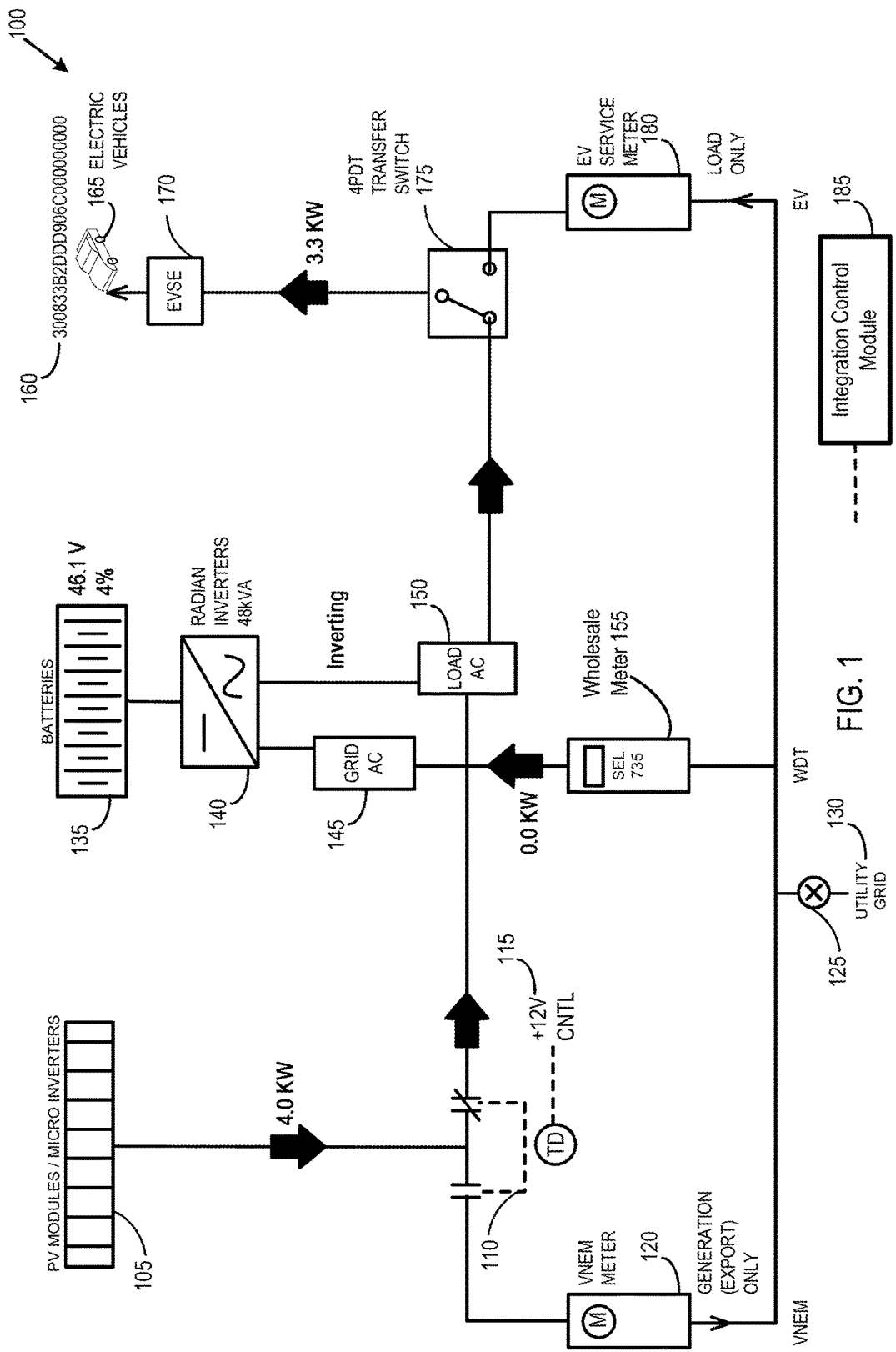
FIG. 1 is a block diagram illustrating one example of a system in which the present systems and methods are implemented.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The present systems and methods describe various techniques for providing electrical energy to charge one or more electric vehicles. Electric vehicles are becoming more and more popular among consumers. As a result, more and more consumers are purchasing electric vehicles. It is anticipated that this trend will increase and that there will be a complete shift in the market so that electric vehicles rather than vehicles that run on fossil fuels will begin to dominate the roadways.

With this transition and shift to electric vehicles comes other shifts, including how vehicles are refueled. Vehicles that run on fossil fuels require gas stations to refuel. Therefore, drivers of fossil fuel powered vehicles must take time to stop and refuel their vehicles. While electric vehicles can be plugged in and recharged at a charging station, similar to refueling of a fossil fuel vehicle at a gas station, electric vehicles have the advantage of being able to be recharged at home (using a personal electric vehicle charger in the garage, for example). This provides a super convenient option for drivers of electric vehicles because it means that they can recharge their electric cars without going anywhere special, and that they can typically begin every drive with a fully charged battery.

However, not everyone is a homeowner, or a homeowner with a garage where they can recharge their electric car. For example, renters may not be able to install an electric vehicle charger and/or may not have a place to install an electric vehicle charger. This may represent a sizable percentage of consumers. As the use of electric vehicles continues to grow and become more widespread, more and more of these types of consumers will be purchasing electric vehicles and will be needing a solution for charging their electric vehicle.

The present systems and methods address this and many other issues associated with electric vehicle charging. While the above description suggests that this issue of being able to recharge an electric vehicle at home is limited to a selected group of people, such as renters or those unable to install an electric vehicle charger, it is appreciated that a similar issue is faced by those who drive their electric vehicle to work and need to recharge at work in order to make the drive back home. Therefore, as will be recognized from the description below, the present systems and methods are beneficial to all electric vehicle owners. For example, the present systems and methods provide for different electrical vehicles to be charged at a location (be it at home, at an apartment, at a place of work, an airport, etc.).

Different electric vehicles (for example, those made by different manufacturers, or even those made by the same manufacturer) may be designed to be charged at different charging rates. For example, a first electric car may be designed to be charged at lower amperage (e.g., twenty (20) amps) while a second electric car may be designed to be charged at higher amperage (e.g., seventy (70) amps). Recharging at lower amperage may be accomplished using standard household wiring. However, standard household wiring is not capable of delivering the higher amperage. This problem is exacerbated when more than one electric vehicle is being charged simultaneously. For example, three (3) electric vehicles drawing seventy (70) amps apiece would require two hundred and ten (210) amps. This may be more than the electric utility service (e.g., the grid) can supply without the addition of specialized equipment. That is, the grid on its own may not be able to supply the needed amperage. Accordingly, systems and methods are provided for addressing this issue.

In some embodiments, both the grid and an energy storage device (e.g., a battery, batteries, hereinafter referred to as battery) may be available for use as a current source. The grid may be limited in the amount of current (e.g., amperage) that it can deliver, while the battery may be able to deliver high currents. A transfer switch allows the system to receive the current either solely from the grid or solely from the battery (in an alternate embodiment, current may be received from a combination of the grid and the battery, for example). The electric vehicle charging system determines the preferred charging rate (e.g., the preferred current flow)

for charging an electric vehicle. The preferred charging rate, may be the maximum charging rate and/or the manufacturer recommended charging rate (for maximizing the life of the battery, for example). The electric vehicle charging system compares this preferred charging rate with the charging rate available from the grid and the charging rate available from the battery. If the preferred charging rate can be supplied by the grid (and given the electric rates, it is economically beneficial to utilize the grid, for example) then the transfer switch may be configured to select the grid so that the preferred current can be supplied by the grid. If, on the other hand, the preferred charging rate cannot be supplied by the grid (i.e., the preferred current requirement is greater than can be supplied by the grid), then the transfer switch may be configured to select the battery so that the preferred charging rate can be supplied by the battery.

In some cases, a renewable current source, such as a PV current source is also included in the electric vehicle charging system. Current from the renewable current source may be added to the current provided by the battery and/or added to the current provided by the grid to achieve the preferred charging rate.

The combination of a grid current source, a battery current source (and storage device, for example), and renewable energy current source may provide additional benefits beyond the ability to achieve desired charging rates. Such benefits include the ability to use a virtual net metering arrangement to allocate energy to various residents of a location via a utility while also enabling an ability to have the solar PV cells operationally useful when the grid is out or the system is islanded. For example, the residents may purchase a portion of the PV cells and have access to electrical energy associated with their purchased portion. In one example, given the battery, the battery may provide the purchased portion to the residents, even in the case that the grid is unavailable (i.e., the system is islanded).

Another benefit includes the ability to utilize battery systems in multiple concurrent services and revenue generating methods including (1) participation in grid ancillary services, (2) as a support for emergency power, and (3) as a power boost for loads that require a higher rate of charge, such as electric vehicles (EVs). Accordingly, the present systems and methods may be used in various situations in addition to electric vehicle charging.

Yet another benefit includes the ability to utilize a small circuit to connect an EV supply equipment (EVSE) charging system to the grid (e.g. a 10 to 20 amp circuit) while having the capability to deliver much higher power to vehicles (upwards to 70 amperes or more). This may be particularly beneficial when incorporating the present systems and methods in locations (such as the wiring closet of a preexisting complex) that were not wired to support high current charging. This also illustrates the possible constraints on the amount of current that can be supplied by the grid (because the local wiring/infrastructure has current limits, for example). In one embodiment, higher power rates can be achieved by intelligently switching the source of current from the grid to the battery system when a high rate of charge is required. For example, the system may identify a specific vehicle make or model to determine what charge rate is required or possible. A small circuit to connect to the grid with the possibility for providing high rate of charge using a battery or other energy source can save on electrical upgrade requirements, lowers costs, and preserve the battery for other functions.

In some embodiments, the present systems and methods may be implemented using discrete components (such as relays, switches, and application specific processors). In other embodiments, the present systems and methods may be implemented using discrete components and instructions that are executable by a processor.

The present systems and methods may determine a rate of charge required by a given vehicle. In one embodiment, the system may identify a vehicle make/model, or uniquely identify the vehicle (via license plate information, radio-frequency identification (RFID), a vehicle identification number (VIN), or a serial number, for example) in order to determine a proper or maximum charging rate for the vehicle. Example systems, methods, and apparatuses for identifying a vehicle are disclosed in publication number WO2014110107A1.

The present systems and methods may also determine a rate of charge based on knowledge of the local wiring. For example, information about local wiring circuitry, or connection with a utility can be stored. In some cases, the current that can be supplied by the local wiring circuitry may be limited due to the design and/or components used in the local wiring. In many cases, electric vehicle charging systems will be retrofitted into existing electrical systems that were not designed for high current applications. Based on the requirements for a vehicle, the system can determine whether the utility connection can be used or if a local storage (battery) or generation system (solar PV cells) or a combination of the storage and the PV should be used to reach the required or desired/preferred charge rate.

An intelligently controlled multiple switch unit may be used to transfer the EVSE (i.e., electric vehicle charger) from one source (grid) to a higher current source (the battery system and inverters) based on the determined charge rate and/or the knowledge of local wiring.

A bidirectional time-delayed multi pole (hots and neutral, for example) transfer switch may be used to allow for supplemental powering from the solar PV cells or other renewable current source. In one example, the bidirectional time-delayed transfer switch may (in a first position, for example) provide current from the solar PV cells to the grid or may (in a second position, for example) provide current from the solar PV cells to the internal AC network that includes the battery, for example.

In the present systems and methods at least some of the components (e.g., the battery, renewable current source, bidirectional time-delay transfer switch, intelligently controlled multiple switch unit) may be arranged behind multiple utility meters to allow for accurate metering/measuring of different energy flows. This arrangement of multiple utility meters may allow for better tracking of energy flows and thus enabling energy flows to be optimized based economic conditions such as time of day utility rates. In one example, this arrangement of multiple utility meters may provide for additional business models, such as allowing residents to purchase/leverage shares of renewable current source (e.g., solar PV cells). In some embodiments, the solar PV cells may be located behind a virtual net meter or net meter, a battery may be located behind an ancillary services meter, and an EV charging station may be located behind a load only meter. The multiple meters and components can be arranged in such a fashion that the various services can be delivered. Various examples of arrangements of components behind multiple meters are illustrated in the figures.

Referring now the figures, FIG. 1 is a block diagram illustrating one example of a system 100 in which the present systems and methods are implemented. In particular, FIG. 1 illustrates an islanded situation (i.e., the utility grid 130 is unavailable 125) where solar PV 105 remains useful and the system 100 is providing delivery to load (the electric vehicle 165, for example) while also generating energy that is stored in the batteries 135. In this example, where the utility grid 130 is not functioning, as indicated by the X 125, the power from the PV modules 105 and/or the batteries 135 are directed to the electric vehicle 165.

As illustrated, the PV modules 105 are generating electrical energy (e.g., 4.0 kilowatts (kW)) which is provided to the bidirectional time-delayed multi pole transfer switch 110. Although the described examples consider the specific example of solar PV modules 105, it is understood that the PV modules 105 may be replaced with any comparable renewable energy current source (such as wind, geothermal, wave, etc., for example).

The bidirectional time-delayed multi pole transfer switch 110 may connect the PV modules 105 to either the utility grid 130 or the internal AC system. An example of the bidirectional time-delayed multi pole transfer switch 110 is described in U.S. Pat. No. 8,803,570 B2. As illustrated in FIG. 1, the bidirectional time-delayed multi pole transfer switch 110 is connected with the internal AC system where a portion (e.g., 3.3 kW) of the electrical energy generated by the PV module 105 is provided to the electric vehicle 165 and a remaining portion (e.g., 0.7 kW) is provided to the batteries 135 (assuming no losses, for example). In particular, the load AC 150 provides the portion of electrical energy to the inverters 140 (e.g., radian inverters) where it is converted into DC electrical energy for storage in the batteries 135. As the batteries 135 are being charged, the energy flow is from the load AC 150 to the inverters 140.

The remaining (or rather the determined electrical energy needed to satisfy the preferred charging rate of the electric vehicle 165) is provided to the intelligently controlled multiple switch 175 (which is in the battery current source mode) where it is provided to the electric vehicle supply equipment (EVSE) 170 (e.g., electric vehicle charger) and from there to the electric vehicle 165.

In one example, the electric vehicle 165 may be identified via an identifier 160 (e.g., vehicle identification number (VIN), radio-frequency identifier (RFID), serial number, make/model, etc.). The integration control module 185 may determine a preferred charging rate for the electric vehicle 165 based at least in part on the identifier 160. Although not directly shown, the integration control module 185 may control the position of the bidirectional time-delayed multi pole transfer switch 110 and the position of the intelligently controlled multiple switch 175 (e.g., four pole double throw (4PDT) transfer switch 175)

With the utility grid 130 not being available 125, the virtual net energy meter (VNEM) 120, the wholesale meter 155, and the EV service meter 180 are not used. The VNEM 120 measures the energy that is provided from the PV module 105 to the utility grid 130 (export only, for example). As illustrated, the bidirectional time delayed multi pole transfer switch 110 isolates the VNEM 110 from the PV modules 105 and the internal AC circuit when it is connecting PV modules 105 to the internal AC circuit.

The wholesale meter 155 meters energy that is provided from the utility grid 130 to the grid AC 145. In one example, the wholesale meter 155 may be a California independent system operator (ISO) approved (CAISO) meter. The grid AC 145 provides electrical energy from the utility grid 130 to the inverters 140, so that the batteries 135 may be charged using electrical energy from the utility grid 130.

The EV service meter 180, which may be a load only meter, meters energy that is provided from the utility grid 130, through the intelligently controlled multiple switch 175, and to the EVSE 170 for charging the electric vehicle 165. As illustrated, the intelligently controlled multiple switch 175 isolates the EVSE 170 from the load AC 150 when being supplied by the utility grid 130 (and metered via the EV service meter 180) or isolates the EV service meter 180 from the EVSE 170.

Figure 2:
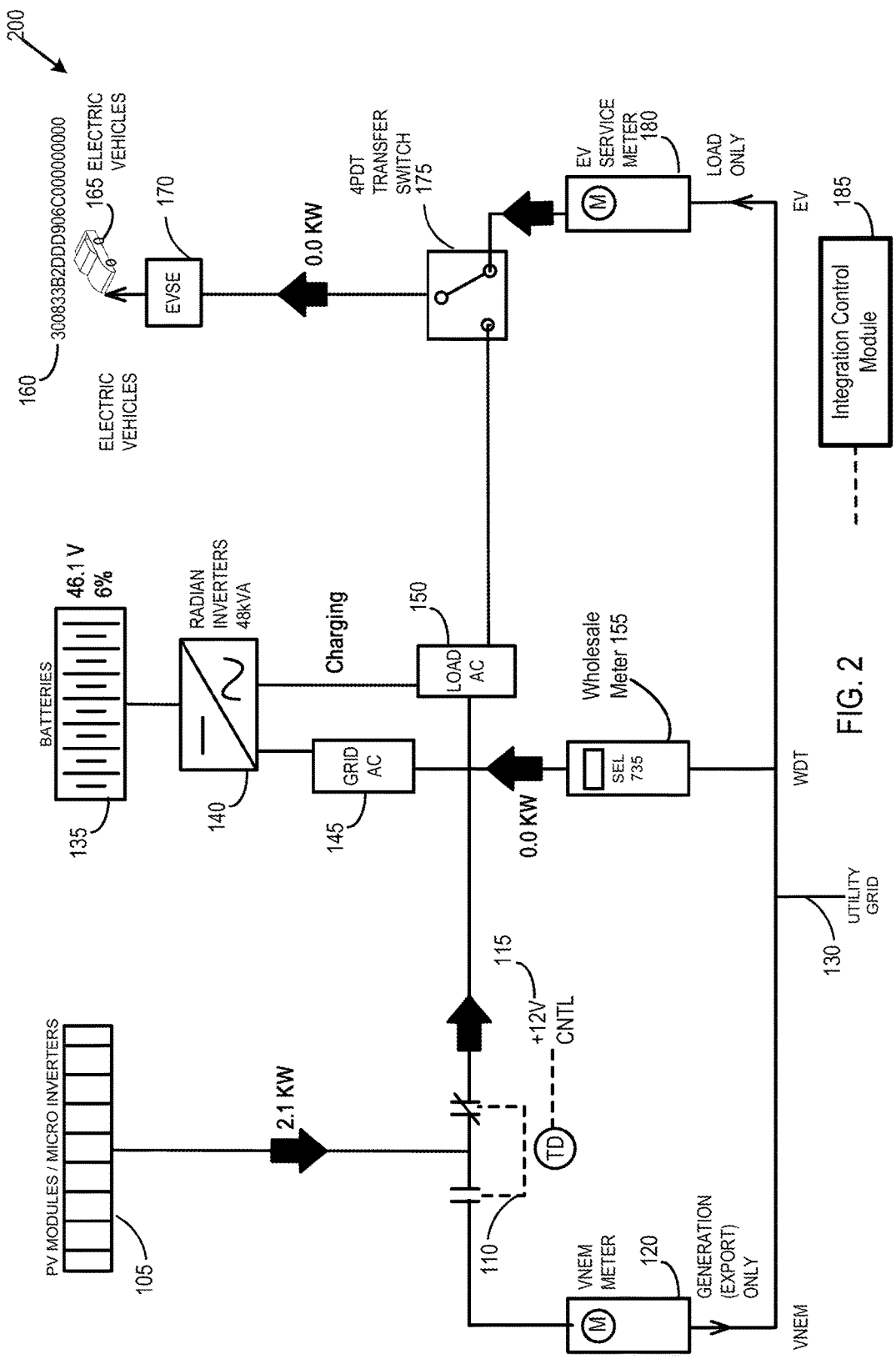
FIG. 2 is a block diagram illustrating another example of a system in which the present systems and methods are implemented.

FIG. 2 is a block diagram illustrating another example of a system 200 in which the present systems and methods are implemented. FIG. 2 is similar to FIG. 1 in that the bidirectional time-delayed multi pole transfer switch 110 is connecting the PV modules 105 to the load AC 150 of the internal AC network where it can be used to charge the batteries 135. However, unlike in FIG. 1, where the utility grid 130 was unavailable 125, in FIG. 2, the utility grid 130 is available and may be used to charge the batteries 135 via the wholesale meter 155 and/or charge the electric vehicle 165 via the intelligently controlled multiple switch 175.

Unlike in FIG. 1, where the intelligently controlled multiple switch 175 was connected to the load AC 150 for providing the EVSE 170 with power from the PV modules 105 and/or the batteries 135, in FIG. 2, the intelligently controlled multiple switch 175 is connected to the EV service meter 180 for providing the EVSE 170 with power from the utility grid 130. With the intelligently controlled multiple switch 175 connecting the EVSE 170 with the utility grid 130, the batteries 135 are isolated from the EVSE 170. However, the batteries 135 can be charged via the utility grid 130 through wholesale meter 155 and/or via the PV modules 105 (when the PV modules 105 are connected to the internal AC (e.g., load AC 150) by the bidirectional time-delayed multi pole transfer switch 110, for example).

Figure 3:
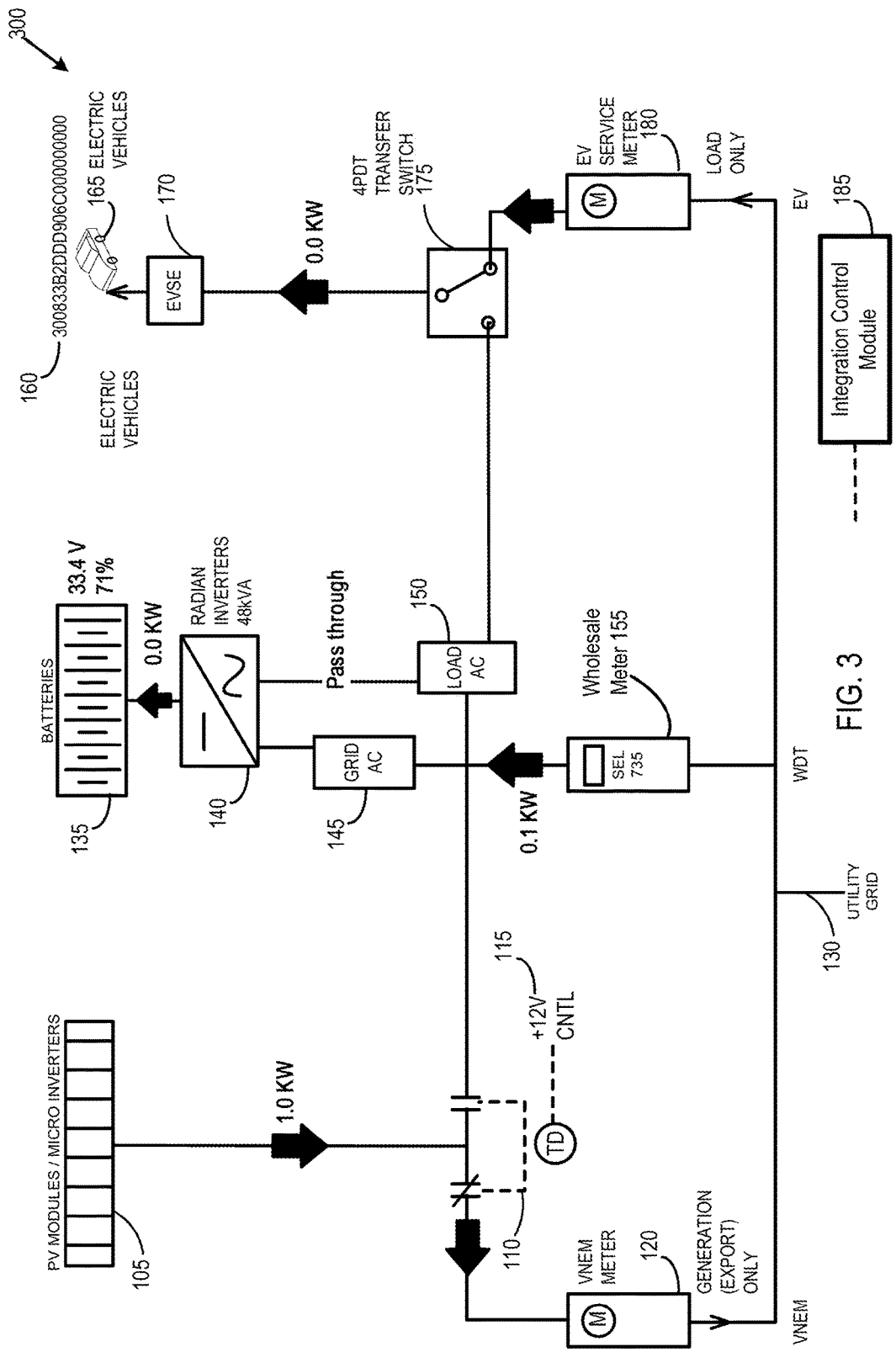
FIG. 3 is a block diagram illustrating another example of a system in which the present systems and methods are implemented.

FIG. 3 is a block diagram illustrating another example of a system 300 in which the present systems and methods are implemented. FIG. 3 is similar to FIG. 2, in that the intelligently controlled multiple switch 175 is providing power to the EVSE 170 from the utility grid 130 and that the utility grid 130 is also being used/is available for charging the batteries 135. However, FIG. 3 is unlike FIG. 2 in that the bidirectional time-delayed multi pole transfer switch 110 is connected for providing power to the VNEM meter 120 rather than the internal AC circuit (e.g., the load AC 150).

As illustrated in FIG. 3, the power from the PV modules 105 is provided to the utility grid 130 via the VNEM meter 120 (which may be an export only meter). In one example, the VNEM meter 120 may measure and enable economic credit to be received for producing electrical power. Although the VNEM meter 120 may measure power production, the system 300 may still be a net consumer of power based on the power from the utility grid 130 that is used to charge the batteries 135 via the wholesale meter 155 and/or the power from the utility grid 130 that is used to charge the electric vehicle 165 via the EV service meter 180.

The various configurations illustrated in FIGS. 1-3 may be selected and/or controlled based on the determinations of the integration control module 185. As noted previously, the determination as to whether the intelligently controlled multiple switch 175 is in grid mode (e.g., powered from the utility grid 130) or in battery mode (e.g., powered from the batteries 135 and/or the PV modules 105) may be determined based on the current requirements (e.g., power requirements) associated with the preferred charging rate of the identified electric vehicle 165. Additionally or alternatively, the selection between grid mode and battery mode may be determined based on the cost of power from the utility grid 130 and/or other load requirements, economic policies, battery charging policies, etc. For example, the integration control module 185 may ensure that batteries 135 are maintained above a particular level and may ensure that the PV modules 105 assist in recharging the batteries 135 prior to exporting power to the utility grid 130. In another example, the integration control module 185 may maximize the use of the power generated by the PV modules 105 to charge the electric vehicle with the batteries 135 supplementing any deficiency needed to provide the preferred charge rate. For instance, the integration control module may utilize the different power sources (e.g., current sources) to minimize the economic cost associated with supplying high current (e.g., high power) loads (e.g., electric vehicle charging).

In one example, these various configurations of providing and/or directing the flow of power may be used to support new business models, such as those listed above, and/or power management scenarios, such as providing battery backup and/or supporting high current needs of the utility grid 130.

Figure 4:
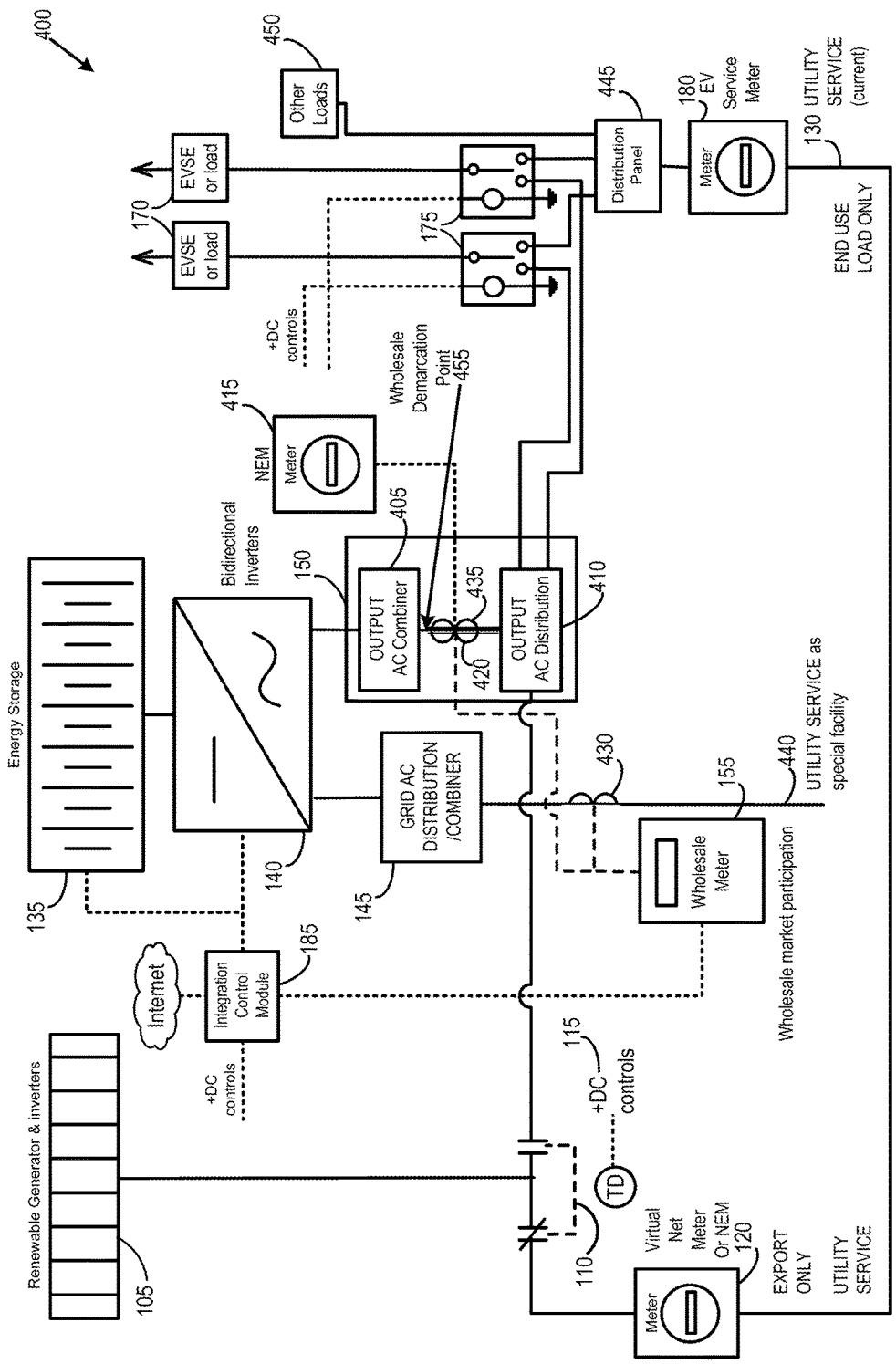
FIG. 4 is a block diagram illustrating yet another example of a system in which the present systems and methods may be implemented.

FIG. 4 is a block diagram illustrating yet another example of a system 400 in which the present systems and methods may be implemented. System 400 addresses several key challenges/issues associated with the use and installation of energy storage.

These challenges/issues include limited existing (i.e., preexisting) electrical capacity at a site, need for higher power to power new loads such as EV charging systems, need to have power available even in case of grid outages or quality problems, need to continue to utilize generation, such as from on-site renewable generation (wind/solar/etc.) during grid outages or to offset onsite costs, need to allow multiple parties in single site to gain credit/benefit from onsite generation, need to allow on-site energy storage to be utilized for grid services, need to enable critical loads and EV Charging to work when grid is out or having quality problems, need to centrally manage a network of these systems, and/or need to utilize most advantageous utility rate tariffs appropriate to the function being performed. The present systems and methods address each of these challenges/issues.

System 400 includes a plurality of meters for metering/measuring the various energy flows in the system 400. These include a first (utility supplied, for example) net energy meter (NEM) 120 or virtual net energy meter (VNEM) 120, a (utility supplied, for example) standard load meter (e.g., EV service meter 180), a wholesale meter 155 suitable for the jurisdiction in which the system is being physically installed, and a second net energy meter (NEM or VNEM) 415.

The wholesale meter 155 may or may not be on a dedicated service at a separate utility service point in the same facility. Examples of wholesale meters 155 that suitable for California include: SEL 734 and SEL 735 by Schweitzer Engineering Laboratories, Quad 4, MAXsys 2510, Elite by Lanids+Gyr, Mark-V by TransData, Inc., Ion8650 A, B, & C, Ion 8600 A, B, & C by Schneider Electric, and Nexus 1272 by Electro Industries/Gauge Tech. The wholesale meter 155 may utilize current transformers (CTs) or the like and may be positioned to measure the electricity flow between the output AC combiner 405 and the output AC distribution 410. This wholesale meter 155 is typically a utility supplied meter but utilizes current transformers for measurement rather than in circuit current measurement. In some embodiments, this meter may be located outside a full system assembly (where the system 400 is configured for taking minimal space in an electrical rack, for example).

The system 400 also includes a renewable generator system with its associated grid interactive inverters 105. As noted previously, this may be solar photovoltaic, wind, hydroelectric, geothermal, natural gas or diesel generator or other such system.

Unlike the systems illustrated in FIGS. 1-3, system 400 of FIG. 4 includes multiple electrical vehicle supply equipment (EVSE) (for charging multiple electric vehicles 165, for example) and/or other loads 450.

System 400 additionally includes a grid AC distribution/combiner 145 that is fed from the utility service as a special facility 440 via the wholesale meter 155. The grid AC distribution/combiner 145 supplies one or more bidirectional inverter units 140. An alternating current (AC) combiner 405 may tie together the AC outputs from one or more bidirectional Inverters 140. In one example, the output AC combiner 405, the output AC distribution 410, and the measurement current transformers (CT) 430, 435 for the wholesale meter 155 are integrated into a single unit (e.g., AC load 150) as illustrated. The point of wholesale demarcation 455 for the utility grid 130 is the point on the combined output of the combined AC sources at the point of measurement and prior to the attachment of any loads at this combined output.

The bidirectional time-delayed transfer switch 110 may take the output of the local renewable generation 105 as the common input and allow transfer of such power to either the utility NEM/VNEM 120 or the AC distribution side of the panel (e.g., output AC distribution 410) at the output of the bidirectional inverters 140. This bidirectional time-delayed transfer switch 110 is controlled under logic from the integrated control module 185, which may also be referred to as a system site controller (that can be used to control multiple sites, for example).

System 400 also includes one or more multi pole transfer switches 175 (one for each EVSE 170, for example). Although only two multi pole transfer switches 175 are shown, more or less may be used without departing from the scope of the present disclosure. The multi pole transfer switches 175 (which are examples of the intelligently controlled multiple switch units 175 discussed previously) may have no time delay and may be configured such that the common pole is connected to the EVSE equipment 170 or load and the normally closed side connected to the EV service meter 180 and associated distribution panel 445 with the normally open side connected to the AC distribution side of the panel (e.g., the output AC distribution 410) at the output of the bidirectional inverters 140. The multi pole transfer switches 175 are also controlled by the integration control module 185 (i.e., system site controller).

As illustrated in FIG. 4, the AC distribution assembly (e.g., AC load 150) accepts the combined AC output from the bidirectional inverters 140 and allows for the distribution of the AC power to the EVSEs 170 and/or other loads 170. Miscellaneous other loads 450 may be served from the same AC distribution and EV service meter 180 that is serving the EVSE loads 170. If EVSEs 170 are not present these other loads 450 may be on a distinct meter from the EV service meter 180.

The integration control module 185 may be a computer that is appropriately configured for use in the application and may contain and run site operation and management software as well as necessary controls and communications interfaces to connect to the elements in the system including the bidirectional inverters 140, the bidirectional time-delayed transfer switch 110, the non-delayed intelligently controlled multi transfer switches 175, wholesale meter 155, and energy storage 135, etc. The integration control module 185 may be connected to the internet for communications and time verification. In one example, the integration control module 185 may utilize a cellular modem, Wi-Fi connection, or any other means of bidirectional connectivity with the Internet.

The bidirectional inverters 140 inverters provide storage base direct current (DC) to AC and AC to DC conversion as well as initial transfer functions and grid quality monitoring. Examples of manufacturers that make bidirectional inverters 140 include Outback Power, SMA, Schneider, etc.

Energy storage 135 (which is an example of the batteries 135 discussed previously) may be a battery based configuration of one or more packs delivering the desired voltage to the bidirectional inverters 140. Additionally or alternately, energy storage 135 may be a flow battery, a compressed air system, or other such viable energy storage device. Such packs may be in series or series/parallel configurations as appropriate to the installation. This component is measured and monitored in accordance with the storage technology in use.

As illustrated in FIG. 4, system 400 includes four meters (e.g., the first NEM meter 120, the EV service meter 180, the wholesale meter 155, and the second NEM meter 415 to facilitate the proper metering of each segment in the system 400. In one embodiment, the use of the wholesale meter 155 facilitates proper energy tracking at retail rates when the system as a whole is isolated from the grid by the bidirectional inverters 140 and also when the battery system (combined of the energy storage device 135, the bidirectional inverters 140, and the integration control module 185, for example) is used for wholesale purposes.

It should be noted that the measurement input to the wholesale meter 155 is configured for the use of oppositely biased current transformers 430, 435 at the input to the wholesale meter 155 (e.g., CT 430) and the combined output of the output AC combiner 405 (e.g., CT 435) so as to deliver a reading of only the net energy consumed by the combination of the bidirectional inverters 140 and the energy storage device and independent of the reading as measured by the second net energy meter 415.

As illustrated in FIG. 4 and the integration control module 185 may coordinate the operation of the bidirectional time-delayed transfer switch 110 and the multi pole transfer switches 175 so that: the renewable generator may be connected to the output AC distribution 410 during grid outage so as to safely supply energy to either charge the energy storage 135 or supply power to the EVSEs or loads 170; to control the direct transfer of energy from the renewable generator 105 to the EVSE or load 170 to avoid losses or measurement inaccuracies at the first NEM meter 120; to deliver supplemental energy and power so as to be measured at the wholesale meter 155; and/or to deliver supplemental power (from the renewable generator 105, for example) so as to be measured at the wholesale meter 155. The integration control module 185 may monitor and decide based on the systems capacities and performance how the use of the bidirectional time-delayed multi pole transfer switch 110 and/or the intelligently controlled multiple switch 175 should be configured.

Figure 5:
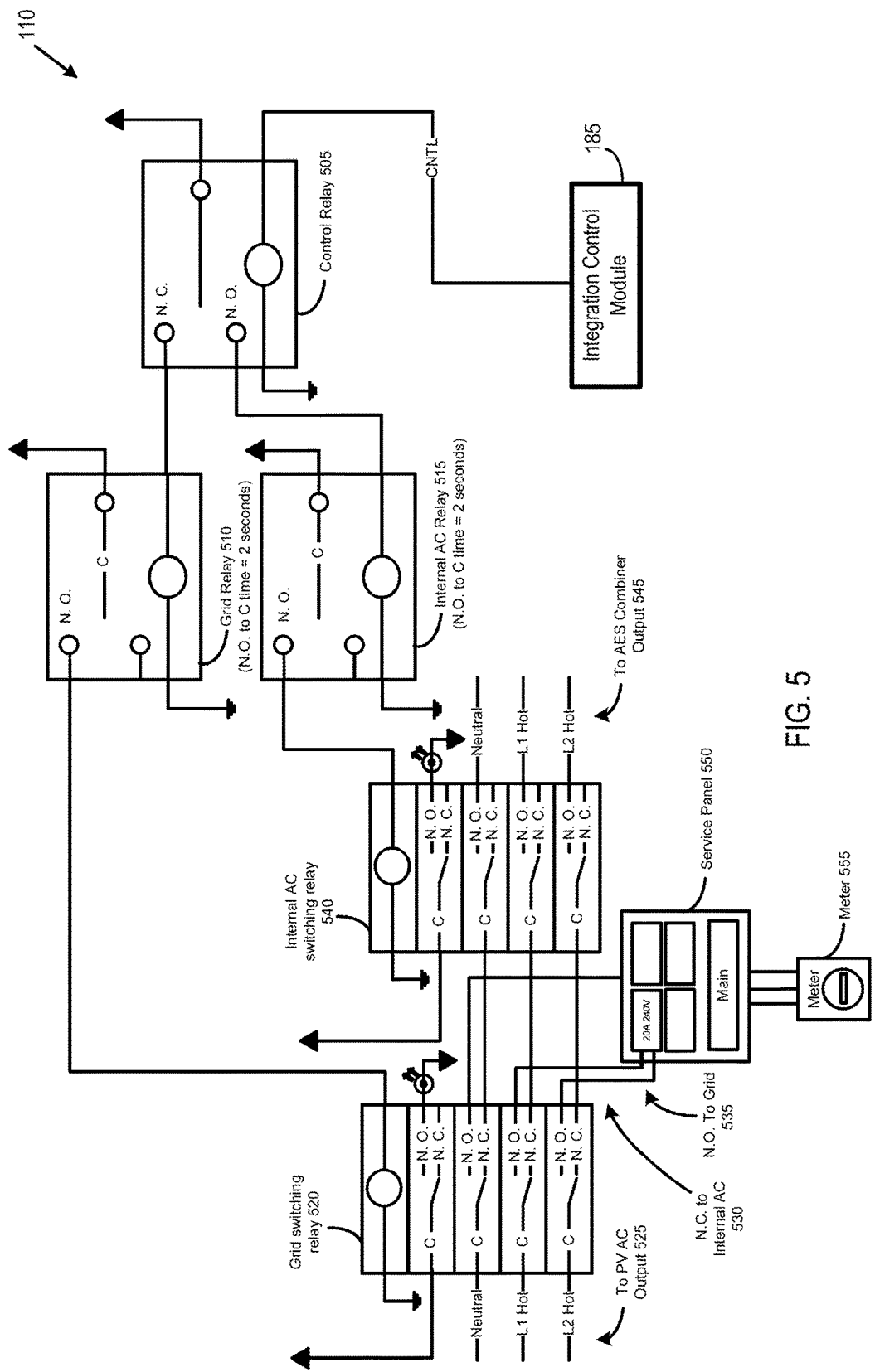
FIG. 5 is a block diagram of one example of the bidirectional time-delayed multi pole transfer switch.

FIG. 5 is a block diagram of one example of the bidirectional time-delayed multi pole transfer switch 110. The bidirectional time-delayed multi pole transfer switch 110 is an example of the bidirectional time-delayed multi pole transfer switch 110 illustrated in FIGS. 1-4. The bidirectional time-delayed multi pole transfer switch 110 is designed to allow the safe transfer of solar PV cell electrical generation (or other renewable generation) to either a grid connection or to an AC coupled internal usage.

The bidirectional time-delayed multi pole transfer switch 110 includes a control relay 505 with a normally closed terminal (N.C.) and a normally open (N.O.) terminal and a common (C) terminal that is pulled up to a voltage (e.g., VCC, 12 volts). The integration control module 185, via control signaling, instructs the control relay 505 to be in one of the N.C. state or in the N.O. state. When the control relay 505 is in the N.C. state (e.g., N.C. is at VCC) then the N.C. terminal is high and the N.O. terminal is low. Similarly, when the control relay 505 is in the N.O. state (e.g., N.O. is at VCC) then the N.O. terminal is high and the N.C. terminal is low.

The grid relay 510 may be connected to the N.C. terminal of the control relay 505 and the internal AC relay 515 may be connected to the N.O. terminal of the control relay 505 so that depending on the state of the control relay 505 only one of the grid relay 510 and the internal AC relay 515 is active at any given time. Both the grid relay 510 and the internal AC relay 515 may provide for a two (2) second delay between each off to on transition point to assure that that any UL1741 compliant connected grid interactive inverters are fully off before they are presented with a new reference signal to operate with.

When activated, the grid relay 510 enables the grid switching relay 510 to be in the N.O. state (e.g., N.O. to grid 535) so that the PV AC output 525 is connected to the utility grid via the service panel 550. Alternatively, when not activated, the grid relay is in the N.C. state (e.g., N.C. to internal AC 530) so that the PV AC output 525 is connected to the AES combiner output 545 through the internal AC switching relay 540 which would be in the activated N.O. state. In this way, the bidirectional time-delayed multi pole transfer switch 110 can control whether the PV AC output 525 is provided to the utility grid or to the AES combiner output 545 (i.e., the internal AC circuit).

In some embodiments, the control signal CNTL is a 12V status signal or control line in communication with the integration control module 185 where HIGH (=+12V) means there is grid power present and GND means grid is out of range or absent. In some cases the power grid switching relay 520 is also referred to as a GRID contactor. This 4 pole dual throw (4PDT) relay connects between the PV output and the circuit breaker for the PV. As illustrated, three (3) of the normally open outputs are connected to the circuit breaker/panel to the grid. The matching 3 commons are connected to the solar PV (L1, L2 and Neutral). The matching three (3) normally closed outputs are connected to the common inputs of the INTERNAL AC 4PDT relay. The GRID relay includes a 24VDC controlled coil.

The internal AC switching relay 540 may also be a 4PDT relay that connects between the PV out and the circuit breaker on the internal AC Combiner panel. Three (3) common inputs connected from the normally closed (NC) outputs of the GRID 4PDT relay 520 supply a connection to the solar PV output when the GRID relay is deactivated. The matching three (3) normally open (NO) outputs are connected to the breaker on the AC combiner on the output of the inverter bank. The INTERNAL AC relay 540 may include a 24VDC controlled coil.

The 4PDT relays 520, 540 may be connected via an electromechanical linkage such that they cannot create a cross connect loop between the internal AC and the grid. Only connections of solar PV to GRID or solar PV to INTERNAL AC or isolated are possible. This is done to assure that if a relay were to fail in a closed position (i.e.

welded by a short) then it will be impossible for the opposite circuit to also be closed into the circuit.

Each time delay TD SPDT relay (e.g., grid relay 510 and internal AC relay 515) may be a single pole dual throw (SPDT) relay attached to a 555 timer which can be set, for example, between 1 second and 10 seconds. In one embodiment, the delay is configured to be 2 seconds but even 1 second may be more time than required for a solar PV inverter to deactivate. The TD relay injects a time delay when energized for the transition of the common connection from the NC pin to the NO pole. When deactivated the transition from enabled to off may be immediate (5 ms or less).

In some embodiments, the control relay 505 may be a time delay relay or a standard non delayed SPDT relay. The control relay 505 may be a 12 V controlled relay. A time delayed version can be used to ensure a delay to allow for other system elements to perform a function before starting the solar PV. In some cases, the +12V (and ground) supply line and for these relays is supplied from a backed up power source (e-Backup) within the system. Similarly, the +24V supply line for corresponding relays 520, 540

The DC coils for the switching relays 520, 540 have different voltages from the other relays (e.g., relays 510, 515). The 4PDT Relays are powered by a 24VDC coil while the TD Relays are powered by +12VDC coils and the input to the TD relay is +12V. It is noted that the although the 12V relays and 24V relays operate at different voltages, they utilize a common ground.

In one example, when no power is present all relays are in their default state. This means BOTH GRID 510, 520 and INTERNAL AC 515, 540 are disconnected. When power is present but no CNTL signal is present (the CNTL signal wire may be broken or there may be some other maintenance activity or fault in the controlling radian unit, for example), the GRID contactor 520 is set to active, connecting the solar PV directly to the grid and keeps the INTERNAL AC open and unconnected. When CNTL is low and there is power (e.g., the signal from the control inverter is valid and set to LOW by the system CPU), then the Grid TD Relay 510 is activated and concurrently the INTERNAL AC TD Relay 515 is deactivated. This means the INTERNAL AC 515 relay will disconnect immediately and then two seconds later the GRID Relay 510 will be closed. When LOW it means the inverter has detected AC Grid power that is within proper operational parameters. This signal may appear sometime after the actual grid AC is presented to the inverter sensors and communicated to the system control CPU (i.e., the integration control module 185).

In another case there is power and the signal from the control radian inverter is valid and set to HIGH (+12V). When HIGH it means the radian inverter has detected AC Grid power that is absent or outside proper operational parameters. This signal appears HIGH concurrently with the actual grid AC state as presented to the radian sensors.

When the CNTL is set to HIGH then the Grid TD Relay 510 is deactivated and concurrently the INTERNAL AC TD Relay 515 is activated. This means the GRID relay 510 will disconnect immediately and then two seconds later the INTERNAL AC relay 515 will be closed.

Figure 6:
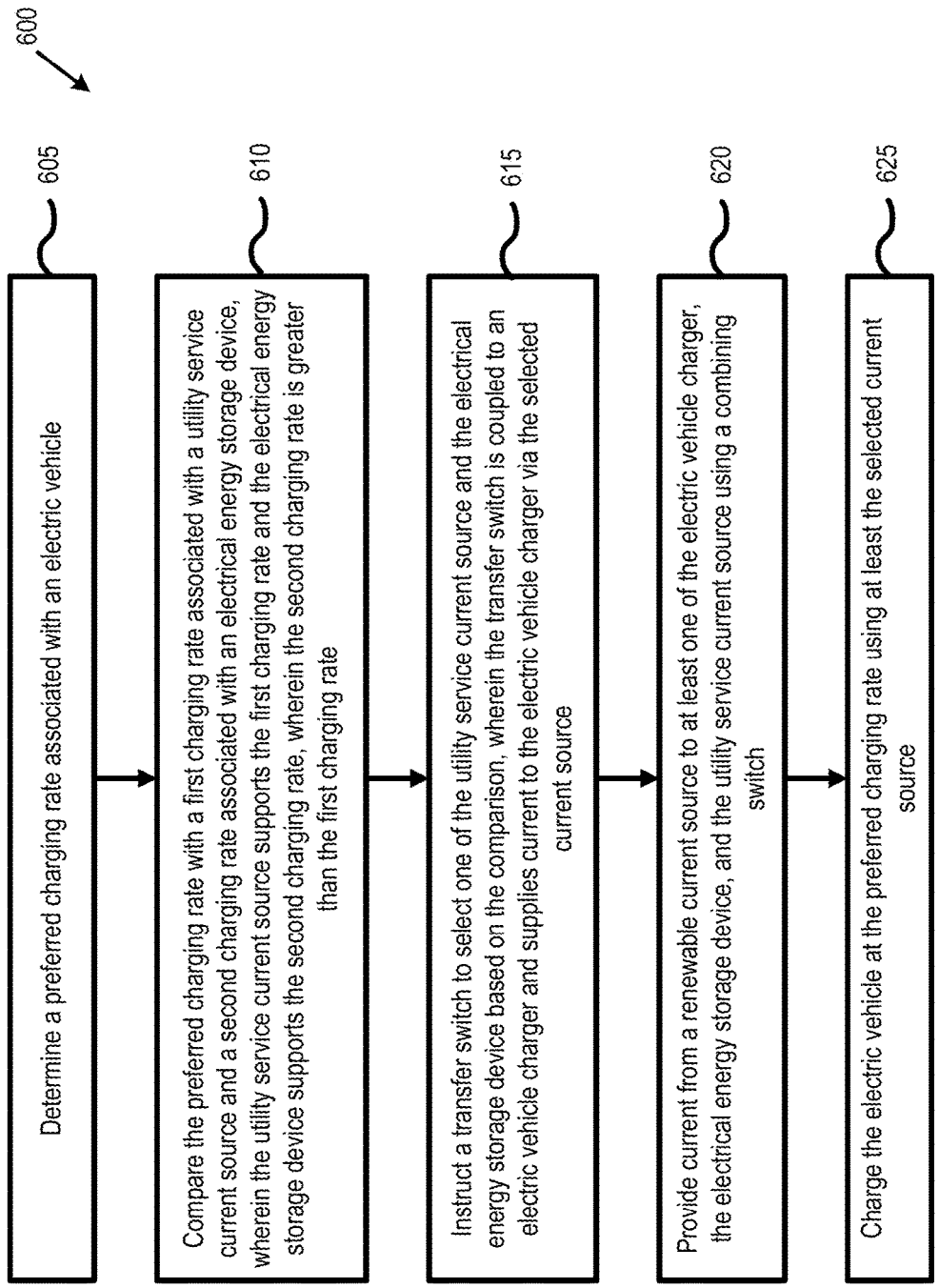
FIG. 6 is a flow diagram of a method for electric vehicle charging.

FIG. 6 is a flow diagram of a method 600 for electric vehicle charging. The method 600 is performed by the integrated control module 185 illustrated in FIGS. 1-5. Although the operations of method 600 are illustrated as being performed in a particular order, it is understood that the operations of method 600 may be reordered without departing from the scope of the method.

At 605, a preferred charging rate associated with an electric vehicle is determined. At 610, the preferred charging rate is compared with a first charging rate associated with a utility service current source and second charging rate associate with an electrical energy storage device. The utility service current source supports a first charging rate and the electrical energy storage device supports a second charging rate. The second charging rate is greater than the first charging rate. At 615, a transfer switch is instructed to select one of the utility service current source and the electrical energy storage device based on the comparison. The transfer switch is coupled to an electric vehicle charger and supplies current to the electric vehicle charger via the selected current source. At 620, current from a renewable source is provided to at least one of the electric vehicle charger, the electrical energy storage device, and the utility service current source using a combining switch. At 625, the electric vehicle is charged at the preferred charging rate using at least the selected current source.

The operations of method 600 may be performed by an application specific processor, programmable application specific integrated circuit (ASIC), field programmable gate array (FPGA), or the like.

Figure 7:
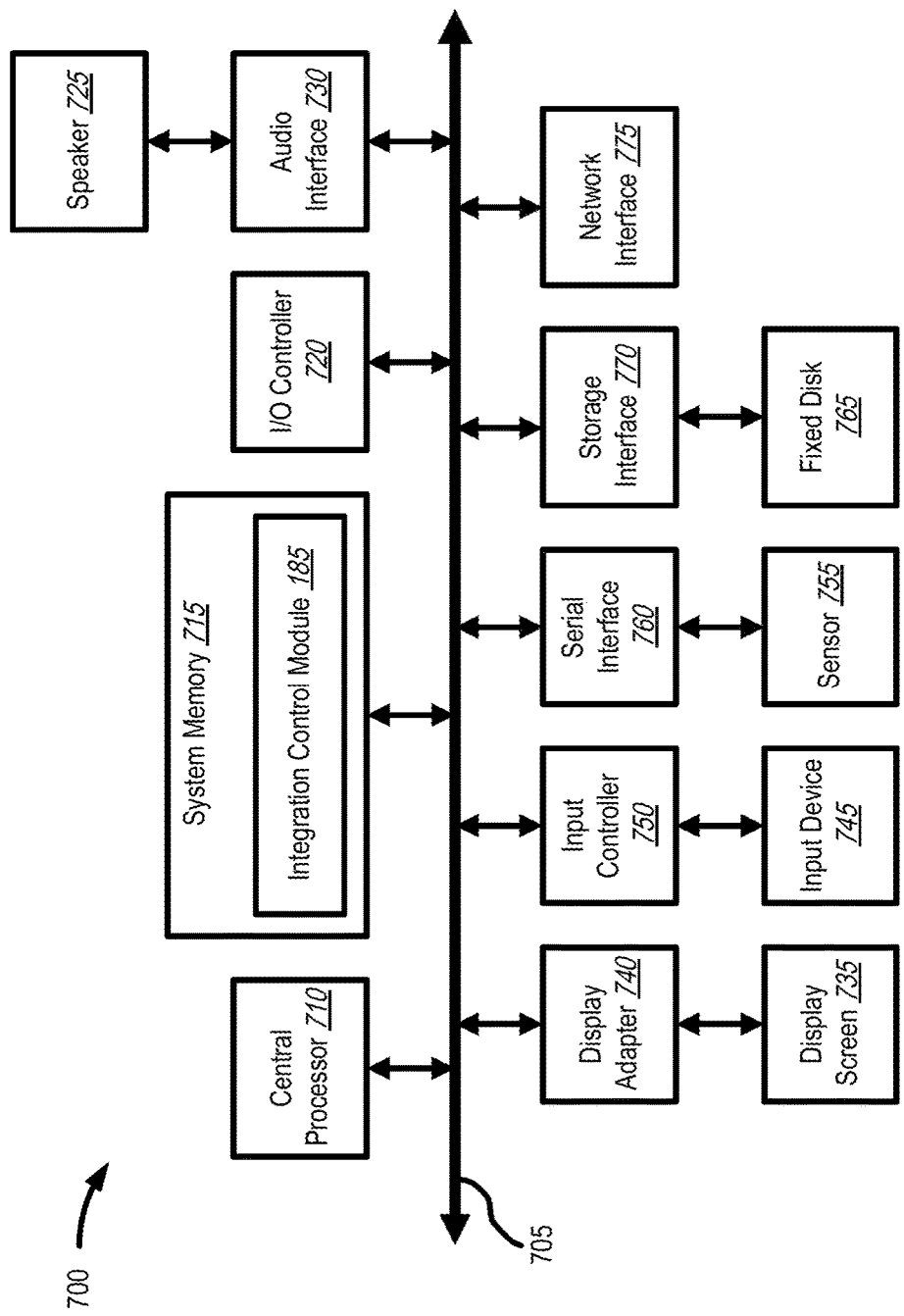
FIG. 7 depicts a block diagram of a computer system suitable for implementing the present systems and methods.

FIG. 7 depicts a block diagram of a computer system 700 suitable for implementing the present systems and methods. Computer system 700 includes a bus 705 which interconnects major subsystems of computer system 700, such as a central processor 710, a system memory 715 (typically RAM, but which may also include ROM, flash RAM, or the like), an input/output (I/O) controller 720, an external audio device, such as a speaker system 725 via an audio output interface 730, an external device, such as a display screen 735 via display adapter 740, an input device 745 (e.g., keyboard, touchpad, touch screen, voice recognition module, etc.) (interfaced with an input controller 750), a sensor 755 (e.g., current sensor) or input device via a serial interface 760, a fixed disk (or other storage medium, for example) 765 via a storage interface 770, and a network interface 775 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the isolated energy measurement meter 130 to implement the present systems and methods may be stored within the system memory 715. Applications resident with computer system 700 are generally stored on and accessed via a non-transitory computer readable medium, such as a hard disk drive (e.g., fixed disk 765) or other storage medium.

Storage interface 770, as with the other storage interfaces of computer system 700, can connect to a standard computer readable medium for storage and/or retrieval of information, such as a fixed disk drive (e.g., fixed disk 765). Fixed disk drive may be a part of computer system 700 or may be separate and accessed through other interface systems. Network interface 775 may provide a direct connection to a remote server via a direct network link to the Internet. Network interface 775 may provide such connection using wireless techniques, including digital cellular telephone connection, Cellular Digital Packet Data (CDPD) connection, digital satellite data connection, or the like.

Many other devices or subsystems (not shown) may be connected in a similar manner. Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in a non-transitory computer-readable medium such as one or more of system memory 715 or fixed disk 775. The operating system provided on computer system 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks.

Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal whether due to circuit limitations or due to passage through other circuit elements which do not change the informational and/or final functional aspect of the first signal.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the disclosure. One skilled in the relevant art will recognize, however, that the disclosure may be practiced without one or more of the specific details, or with other methods, components, materials, etc. In other instances, well-known structures, materials, or operations are not shown or described in detail to avoid obscuring aspects of the disclosure.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present disclosure should, therefore, be determined only by the following claims.

The invention claimed is:

1. A system for electric vehicle charging, comprising:
an electric vehicle charger;
a transfer switch that is coupled to the electric vehicle charger and supplies current to the electric vehicle charger from one of a utility service current source and an electrical energy storage device, wherein the utility service current source supports a first charging rate and the electrical energy storage device supports a second charging rate that is greater than the first charging rate;
a combining switch that provides current from a renewable current source to at least one of the utility service current source and the electrical energy storage device; and
one or more processors to:
determine a preferred charging rate associated with an electric vehicle;
compare the preferred charging rate with the first and second charging rates; and
instruct the transfer switch to select one of the utility service current source and the electrical energy storage device based on the comparison.

2. The system of claim 1, wherein the one or more processors instruct the transfer switch to select the utility service current source when the preferred charging rate is less than or equal to the first charging rate.

3. The system of claim 2, wherein the electric vehicle charger charges the electric vehicle at the preferred charging rate via the utility service current source and the current from the renewable current source is provided to at least one of the electrical energy storage device and the utility service current source.

4. The system of claim 2, wherein at least a portion of current from the utility service current source is provided to the electrical energy storage device.

5. The system of claim 1, wherein the one or more processors instruct the transfer switch to select the electrical energy storage device when the preferred charging rate is greater than the first charging rate.

6. The system of claim 5, wherein the electric vehicle charger charges the electric vehicle at the preferred charging rate via a combination of current from the electrical energy storage device and the current from the renewable current source.

7. The system of claim 5, wherein the electric vehicle charger charges the electric vehicle at the preferred charging rate via the electrical energy storage device and at least a portion of the current from the renewable current source is provided to the utility service current source.

8. The system of claim 1, further comprising:
a vehicle identification system that identifies the electric vehicle, wherein the one or more processors determine the preferred charging rate associated with the electric vehicle based on the identification of the electric vehicle.

9. The system of claim 1, wherein the combining switch comprises a bidirectional time delayed multi-pole transfer switch.

10. The system of claim 1, further comprising:
a virtual net meter, wherein the renewable current source is behind and metered via the virtual net meter;
an ancillary services meter, wherein the electrical energy storage device is behind and metered via the ancillary services meter; and
a load meter, wherein the electric vehicle charger is behind and metered via the load meter.

11. The system of claim 1, wherein the renewable current source comprises a photovoltaic current source.

12. A method for electric vehicle charging, comprising:
determining a preferred charging rate associated with an electric vehicle;
comparing the preferred charging rate with a first charging rate associated with a utility service current source and a second charging rate associated with an electrical energy storage device, wherein the utility service current source supports the first charging rate and the electrical energy storage device supports the second charging rate, wherein the second charging rate is greater than the first charging rate;
instructing a transfer switch to select one of the utility service current source and the electrical energy storage device based on the comparison, wherein the transfer switch is coupled to an electric vehicle charger and supplies current to the electric vehicle charger via the selected current source;
providing current from a renewable current source to at least one of the electric vehicle charger, the electrical energy storage device, and the utility service current source using a combining switch; and
charging the electric vehicle at the preferred charging rate using at least the selected current source.

13. The method of claim 12, wherein instructing the transfer switch to select one of the utility service current source and the electrical energy storage device based on the comparison comprises instructing the transfer switch to select the utility service current source when the preferred charging rate is less than or equal to the first charging rate.

14. The method of claim 13, wherein the current from the renewable current source is provided to at least one of the electrical energy storage device and the utility service current source.

15. The method of claim 13, wherein at least a portion of current from the utility service current source is provided to the electrical energy storage device.

16. The method of claim 12, wherein instructing the transfer switch to select one of the utility service current source and the electrical energy storage device based on the comparison comprises instructing the transfer switch to select the electrical energy storage device when the preferred charging rate is greater than the first charging rate.

17. The method of claim 16, wherein the current from the renewable current source is provided to the electric vehicle charger, and wherein charging the electric vehicle at the preferred charging rate comprises charging the electric vehicle at the preferred charging rate via a combination of current from the electrical energy storage device and the current from the renewable current source.

18. The method of claim 16, wherein at least a portion of the current from the renewable current source is provided to the utility service current source.

19. The method of claim 12, further comprising:
identifying the electric vehicle using an electric vehicle identification system, wherein the preferred charging rate associated with the electric vehicle is determined based on the identification of the electric vehicle.

20. The method of claim 12, wherein the combining switch comprises a bidirectional time delayed multi-pole transfer switch.

21. The method of claim 12, further comprising:
metering the renewable current source via a net meter, wherein the renewable current source is behind the net meter and selectively connected to the net meter via the combining switch.

22. The method of claim 12, further comprising:
metering the electrical energy storage device via an ancillary services meter, wherein the electrical energy storage device is metered in isolation with respect other components.

23. The method of claim 12, further comprising:
metering energy provided by the utility service current source via a load meter, wherein the load meter measures the energy provided to at least one of the electric vehicle charger and the electrical energy storage device.

* * * * *